United States Patent Office 3,298,251
Patented Jan. 17, 1967

3,298,251
CONSTANT-SPEED DRIVES
Norman Moss, Ilford, England, assignor to Plessey U.K.
Limited, a British company
Filed Dec. 23, 1963, Ser. No. 332,973
Claims priority, application Great Britain, Jan. 11, 1963,
1,344/63
7 Claims. (Cl. 74—687)

This invention relates to drives which serve to utilise mechanical power from an engine subject to speed variations, for example from an aircraft propulsion turbine forming part of a turbojet unit, to drive an element, hereinafter called constant-speed element, for example an A.C. generator, of which the speed must be kept constant within relatively narrow limits. Such a drive is hereinafter called a constant-speed drive. The invention has for an object to provide an improved constant-speed drive which combines a high overall efficiency with a relatively simple construction, and in which hydraulic power can be used to start the engine.

According to the present invention the constant-speed element is coupled to the engine by means of a differential gear train having three input-and-output elements, one of these elements being coupled with a constant-displacement hydraulic machine which forms a hydraulic circuit with a variable-displacement hydraulic machine driven by the engine, means controlled by the speed, or by speed-variations, of the constant-speed element being provided for varying the displacement of the variable-displacement machine in such manner that the displacement of the variable-displacement machine corresponds in direction and is proportional in magnitude to the amount by which said engine-derived speed is below the desired constant speed, while the variable-displacement machine has zero displacement when the engine-derived speed of the constant-speed element, i.e., the speed of said element with the fixed-displacement machine stationary, is equal to the desired constant speed, this control of the variable-displacement machine being conveniently achieved by means of a hydraulic ram the supply to which is controlled by a hydraulic governor unit mechanically coupled to the constant-speed output. Furthermore the unit according to the present invention is so constructed as to allow one or both of the hydraulic displacement machines to be used as a motor fed with hydraulic liquid from an external pressure source, in such manner as to enable the unit to be used for starting the engine and/or for so-called ground running of engine auxiliaries when the engine itself is not operating.

Figure 1:
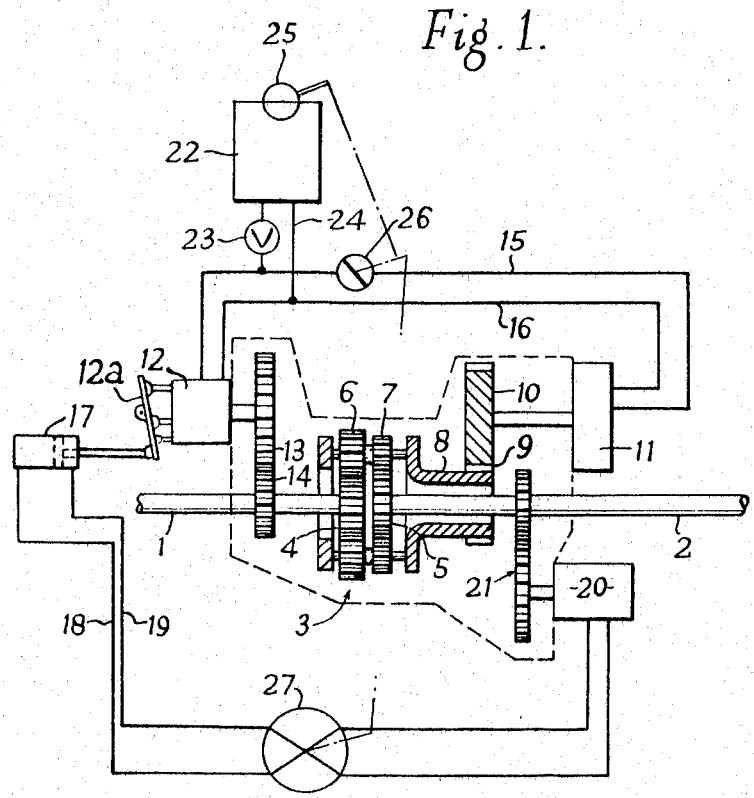
Figure 2:
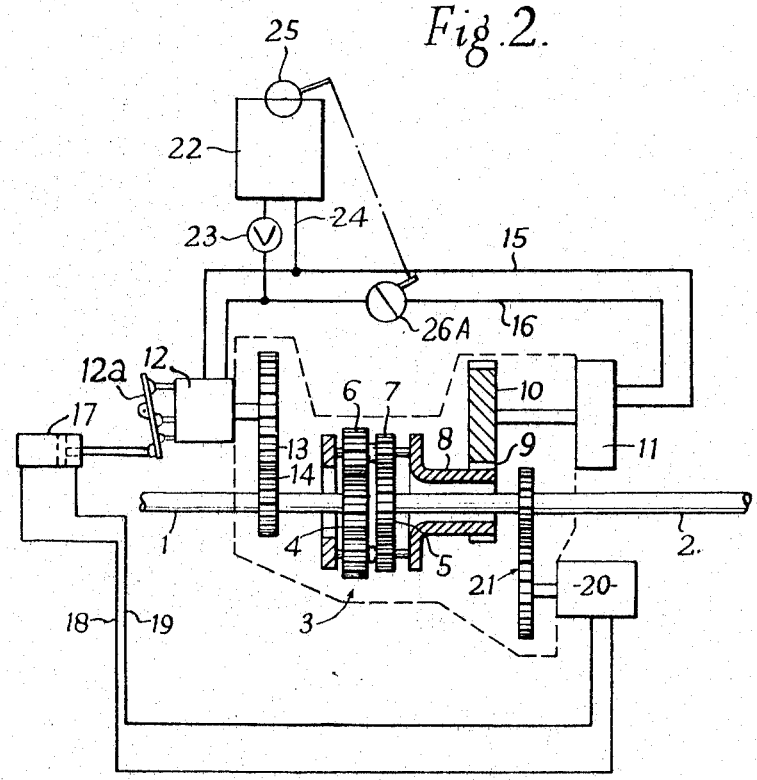

In the accompanying drawing FIGURE 1 diagrammatically illustrates one form of constant-speed drive according to the invention, and FIGURE 2 illustrates an alternative form.

Referring now first to FIGURE 1, an input shaft 1 which forms part of, or is coupled to, an engine shaft, is coupled to a constant-speed output shaft 2 by a differential-gear drive 3. The latter includes two sun gears 4 and 5 respectively fixed on the input shaft 1 and the output shaft 2, and planet-gear sets each comprising two planet gears 6, 7 fixed on a common shaft rotatably mounted in a planet carrier 8. The planet gears 6 and 7 of each set respectively intermesh with the two sun gears 4 and 5, and the planet carrier 8 has a ring of gear teeth 9 engaging a gear 10 on the main shaft of a fixed-displacement hydraulic rotary machine 11. A variable-displacement hydraulic rotary machine 12, which carries on its main shaft a gear 13 which meshes with a gear 14 on the input shaft 1, is hydraulically connected in a closed circuit with the fixed-displacement machine 11 by a pair of hydraulic lines 15, 16. The displacement of the hydraulic machine 12 is adjustable from a negative maximum through zero to a positive maximum by a hydraulic ram device 17, which operates to vary the angle of a swash plate 12a to control the displacement of the variable-displacement machine 12, and which is connected by a pair of hydraulic control lines 18, 19 with a hydraulic governor unit 20, which is driven from the output shaft 2 by a gear train 21 and which is arranged to supply pressure liquid to line 18 and allow liquid to escape from line 19 when the speed of the output shaft 2 is below the desired constant speed, and conversely admit liquid under pressure to line 19 and allow liquid to escape from line 18 when the output-shaft speed is above the said desired speed.

In order to enable the constant-speed drive to be also used for starting the engine and for so-called ground running, i.e., for running the engine auxiliaries when the engine is at a standstill, an independent source 22 of hydraulic pressure is connected to the pressure line 15 of the hydraulic circuit interconnecting the machines 11 and 12, with the interposition of a non-return valve 23. A return path 24 from the low pressure line 16 of the same circuit to the source 22 is also provided, and a control element 25 for the pressure source 22 is coupled for common actuation with a cut-off valve 26 which is arranged in the said line 15 between its junction with the power-source connection and the fixed-displacement machine 11, and which cuts off connection between this junction and the fixed-displacement machine when power is supplied from source 22. In addition the control element 25 is coupled with a change-over device 27 arranged to inter-change, at the same time with this cut-off action, the connections between the hydraulic governor unit 20 and the ram unit 17 in such manner that, when pressure liquid is supplied from source 22 through the non-return valve 23, the hydraulic machine 12 will run as a motor in the same direction in which it runs as a pump when it is driven by the engine. This permits during starting and ground running the hydraulic governor unit 20 to be utilised for automatically varying the displacement of the motor 12 in such manner as to limit the speed at which the engine shaft 1 and output shaft 2 are driven by the variable-displacement machine 12 when the latter operates as a motor. The fixed-displacement machine 11 and thus the planet carrier 8 is under these circumstances locked against rotation by the closure of the cut-off valve 26.

In the embodiment illustrated in FIGURE 2 the pressurised liquid for driving the variable-displacement machine 12 is supplied from the external source 22 to the line 16, which is normally the low-pressure line, thus reversing the normal pressure relationship of the two lines but retaining the swash plate 12a at the same direction of inclination which it has at low input speeds when the machine 12 works as a pump.

What I claim is:
1. A constant-speed drive comprising an input shaft element for connection to a prime mover operable at a variable speed in a predetermined direction, a constant-speed shaft element for connection to a load required to be driven at a constant speed in a predetermined direction, a third element, a differential gear drive by which the three said elements are operatively connected, a constant-displacement hydraulic machine drivingly connected to said third element, a variable-displacement hydraulic machine drivingly connected to one of said shaft elements, a pair of hydraulic lines connecting said variable displacement hydraulic machine in a closed hydraulic circuit with said constant-displacement hydraulic machine, governor means responsive to a speed error of the constant-speed element compared with the required constant speed and operative to so vary the displacement of said variable-displacement machine between a positive maximum and a negative maximum as to reduce such speed error, an independent hydraulic pressurising device having a low-pressure inlet and a high-pressure outlet, starter-selection means for connecting the inlet of said pressurising device to one and the outlet of said pressurising device to the other line of said pair of hydraulic lines and for at the same time preventing flow through the constant-displacement machine while causing flow from said source through the variable-displacement machine to drive the latter in the direction corresponding to rotation of the associated shaft element in its predetermined direction.

2. A device as claimed in claim 1, wherein the outlet of said pressurising device is connected to that hydraulic line which in closed-circuit operation of the two hydraulic displacement machines constitutes the high-pressure line, said starter-selection means including means for reversing the direction of variation of the displacement of the variable-displacement machine effected by the governor means in response to a speed error.

3. A device as claimed in claim 2, wherein the connection between the high-pressure outlet of said pressurising means and said line includes a non-return valve.

4. A device as claimed in claim 2, including a reversible servomotor for varying the displacement of the variable-displacement machine and a pair of signal lines interconnecting said servomotor with the governor device for the transmission of directional signals from said governor device to said servomotor and a reversing switch device interposed in signal lines for selective cross-over of said lines, said starter-selection means including a cut-off valve in one of the closed-circuit lines at a point between the respective connection of said line to the pressurising source and a constant-displacement machine, and means interconnecting said cut-off valve and reversing switch device for common operation.

5. A device as claimed in claim 1, wherein the outlet of said pressurising device is connected to that hydraulic line which in closed-circuit operation constitutes the low-pressure line.

6. A device as claimed in claim 1, wherein the variable-displacement device is drivingly connected to the input-shaft element.

7. A device as claimed in claim 4, wherein the variable-displacement device is drivingly connected to the input shaft element.

References Cited by the Examiner

UNITED STATES PATENTS

| | | | |
|---|---|---|---|
| 2,310,115 | 2/1943 | Popoff | 74—675 |
| 2,363,201 | 11/1944 | Pofoff | 74—675 |
| 2,402,547 | 6/1946 | Gilfillan | 74—675 |
| 2,599,814 | 6/1952 | Cull | 74—687 |
| 2,908,189 | 9/1959 | Parker et al. | 74—675 |
| 2,994,233 | 8/1961 | Gerard | 74—687 |
| 2,995,049 | 8/1961 | Bolliger | 74—687 |
| 3,023,638 | 3/1962 | Westbury et al. | 74—687 |
| 3,077,796 | 2/1963 | Johnson et al. | 74—810 |

DAVID J. WILLIAMOWSKY, *Primary Examiner.*

J. R. BENEFIEL, *Assistant Examiner.*